A. LAMPL
SUPPLEMENTAL RESISTANCE FOR SERIALLY MOUNTED LAMPS
June 14, 1932. Original Filed Nov. 9, 1925 Re. 18,495
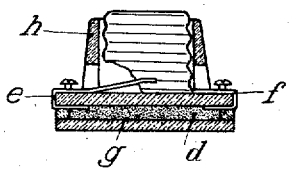
Inventor:
Alfred Lampl Reissued June 14, 1932

Re. 18,495

UNITED STATES PATENT OFFICE

ALFRED LAMPL, OF BERLIN-HALENSEE, GERMANY, ASSIGNOR TO NOMA ELECTRIC CORPORATION OF NEW YORK, OF NEW YORK, N. Y.

SUPPLEMENTAL RESISTANCE FOR SERIALLY-MOUNTED LAMPS

Original No. 1,692,272, dated November 20, 1928, Serial No. 68,042, filed November 9, 1925, and in Germany May 9, 1925. Application for reissue filed July 3, 1929. Serial No. 375,866.

This invention has reference to improved means of switching supplemental, shunt-connected resistances employed with serially arranged lighting systems or the like into circuit upon the interruption of the operation of the lights or of any other equivalent electric devices. It is a well known fact that in the case of electric lamps, particularly with incandescent lamps serially arranged, it has been customary to connect each lamp or group of lamps in parallel or shunt connection with an automatically operating device by means of which at the moment of the breaking of a lamp a supplemental resistance is switched into circuit in place of this particular lamp. In the well known arrangement of this kind which heretofore was regarded as the most simple, least expensive and space-saving device of the kind referred to a conductor of the so-called second class conductors, particularly carborundum, either as one solid piece or as a powder, was disposed between two electrodes connected to the terminals of the lamp and was employed as an automatically operating shunt-resistance. This arrangement, however, has not been universally accepted in practical operation, inasmuch as such second class conductors are unsuitable for the purposes indicated in view of the high specific resistance thereof, the slowness and imperfect operation produced when responding to differences of voltage which becomes evident only as a secondary result of the variation of their heated condition in accordance with the passage of the current, and particularly in view of the insufficient degree of resistibility of such bodies.

Now, in accordance with this invention, the inconveniences, above referred to, in connection with supplemental resistances for serially arranged electric lamps and other electrically operated devices are eliminated by replacing the carborundum referred to or other second class conductors by metallic granules or metal chips which are so disposed as to serve as a supplemental resistance which may consist of a great number of loosely and adjacently disposed small bodies arranged in shunt connection with relation to each particular lamp and adapted to bridge over the point of rupture produced by the interruption of the circuit of the particular lamp. For this purpose, iron or a mixture of iron with another metal particularly nickel as an instance may be employed.

Upon the accompanying drawing, I have shown by way of exemplification and in a somewhat diagrammatic manner an embodiment of the principles of this invention in sectional view. As appears from the drawing, the insulating body *h* of a lamp socket of ordinary construction for incandescent lamps serves at the same time as an insulating casing for the reception of the mass of metallic granules *d* serving for the permanent shunt connection and for the mounting of the two contact electrodes *e* and *f*. With this purpose in view, the foot of the porcelain base *h* of the socket is provided with a transverse passage or cavity *g* into apertures of which provided on two sides of the socket suitable extensions of the current-admitting bars *e* and *f* are adapted to project in such a manner as to provide sufficient contact in all positions of the lamp socket with the mass of coarsely granular pieces of iron or of other metal filings or chips loosely arranged in the cavity *g*. By carefully attaching the electrodes *e* and *f* to the ends of the passage *g* they are not only tightly secured to the porcelain body of the socket but by this means they also provide the necessary closing of the passage *g* so as to keep the granules *d* contained therein substantially adjacent to each other.

The mode of operation of the device described is substantially as follows:—In the ordinary way of operation of the lamp or the like mounted in the socket described the lamp will burn in series with a plurality (mostly seven or fifteen) of other similar lamps each of which individual lamp consumes only a fraction of the total voltage (for instance 14 volts). With a properly selected distance of the electrodes *e*, *f*, of the shunt resistance *d*, its resistivity is infinitely large, as long as a low partial voltage exists at the corresponding lamp terminals. Hence, the current flowing through the shunt branch is equal to zero, so that the lamps arranged in serial connection will burn with their full illuminating strength and without any loss of current. This behavior is due to the fact that each individual particle of the great number of loosely arranged metal granules is surrounded by a microscopically small insulating air or gas envelope. Now, inasmuch as in view of the very high number of these small serially arranged spark gaps only a very slight fraction of the entire partial voltage of, for instance 14 volts corresponds to each one of these gaps, the thus produced series of spark gaps will block the current and will operate therefore as a perfect insulator which prevents all passage of the current therethrough.

If, now, the filament of the incandescent light is broken or provided the current path within the socket is interrupted in any other manner, as for instance by the unscrewing of the lamp, the full line drop of the series (line voltage), for instance 110 or 220 volt, will at once be produced at the terminals *e* and *f* of the socket, which line drop is as a rule a multiple of the partial voltage corresponding to one of the lamps. With a proper adjustment of the several parts this increase of voltage will cause the limits of gap-breaking voltage between two adjoining metal parts to be exceeded, and by this means the numerous immeasurably small spark gaps are broken through and the metal parts are welded to each other at their points of contact by the heat of the small jumping spark. By this metallic welding together or fritting of the loose metal particles the entire metallic mass assumes the character of an ordinary first class conductor and it now offers almost no further resistance of the passage of the current. With the proper dimensioning of the sectional area of the resistor column the supplemental resistance thus produced may be made equal to the resistance of the burning lamp. As long as no supplemental lamp has been substituted for the defective or missing lamp, the supplemental resistance produced in the manner described remains in circuit and produces the result that the entire remaining series of lamps continues to burn with the full illuminating strength. Any possible tendency likely to occur by vibrations of the loosely fritted granular metallic mass and which may cause disaggregation of the granules is overcome by the fact that at the same moment the full voltage of the series will be created at the terminals *e*, *f*, with the result that the aggregates of granules will be fritted again.

As soon, however, as a supplemental lamp is substituted for the missing lamp a slight shaking of the socket is sufficient to produce a complete unfritting of the conducting passage and to restore the metallic mass to its non-conducting condition, which becomes noticeable by the fact that the freshly substituted lamp burns with the full luminating strength as the other lamps of the series. The exchanging of the defective lamps may therefore be effected without the necessity of the switching out of the series through which the current is passed.

In view of the small amount of space required and the simplicity of construction, the supplemental resistance in accordance with the invention may also be employed in all other kinds of lamp sockets, and in the socket or in the glass body of the incandescent lamp itself between the current admitting electrodes which is a point of importance for the utilization and the mode of operation of the subject matter of the invention. The device may also be advantageously employed as an automatically operating supplemental resistance for other kinds of electric lamps, thus for instance for arc lamps and for all kinds of serially connected electric pieces of apparatus.

It should be understood that the invention has only been described herein in its broad features, without being restricted to the particular description thereof, but modifications and changes may occur to suit local and other conditions and without deviating from the spirit and scope of the invention as hereinafter particularly set forth in the appended claims.

I claim:

1. In an electric system, electric contacting terminals and a shunt on said terminals, comprising a supply of loosely aggregated substantially granular iron chips.

2. In an electric system, an insulating socket, electric contacting terminals on said socket, a substantially tubular cavity in said socket, a supply of loosely aggregated small fragments of metallic conductors in said cavity, extensions at the non-contacting portions of said terminals reaching into said cavity at opposite sides thereof and closing said cavity.

3. A shunt comprising a mass of normally loosely aggregated particles under a relatively low voltage, said mass being frittable at a relatively higher voltage and adapted to become unfritted upon reduction of said higher voltage.

4. A shunt comprising a mass of loosely aggregated particles normally non-conductive at a relatively lower voltage, said mass being conductive at a relatively higher voltage and being adapted to again become non-conductive upon reduction of said higher voltage.

5. An electric device adapted for connection to an incandescent filament having a shunt for said filament comprising a supply of loosely aggregated metal particles, said supply being non-conductive at the normal voltage of the filament and adapted to become fritted into a conducting mass upon application thereto of a relatively higher voltage, and unfritted into a non-conducting body upon reduction of said voltage to said normal voltage.

6. An electric device comprising electric contact terminals adapted for connection with a resistance element, a shunt across said terminals comprising a mass of material normally non-conductive at a relatively low voltage, said mass being adapted to become conductive upon raising the voltage above a predetermined voltage and being adapted to again become non-conductive upon reduction of said voltage below said predetermined voltage to said relatively lower voltage.

Signed at Berlin, Germany, this 3rd day of June, 1929.

ALFRED LAMPL.